US008705250B2

(12) United States Patent
Liu

(10) Patent No.: US 8,705,250 B2
(45) Date of Patent: Apr. 22, 2014

(54) FIXING MECHANISM FOR FIXING AT LEAST ONE INTERFACE CARD AND FIXING ROD THEREOF

(75) Inventor: Chia-Hsin Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 7 days.

(21) Appl. No.: 13/183,414

(22) Filed: Jul. 14, 2011

(65) Prior Publication Data

US 2012/0282016 A1   Nov. 8, 2012

(30) Foreign Application Priority Data

May 5, 2011   (TW) ............................. 100115770 A

(51) Int. Cl.
*H05K 7/14*   (2006.01)
(52) U.S. Cl.
USPC ........ 361/801; 403/187; 403/322.1; 403/325; 403/327; 403/329; 403/330
(58) Field of Classification Search
USPC ........... 403/187, 322.1, 322.4, 325, 327, 329, 403/330, 14, DIG. 4; 24/457, 458; 361/798–801
See application file for complete search history.

(56) References Cited

U.S. PATENT DOCUMENTS

| 5,208,735 | A * | 5/1993 | Twachtmann et al. | ........ 361/725 |
| 6,185,106 | B1 * | 2/2001 | Mueller | ........ 361/798 |
| 6,704,205 | B1 * | 3/2004 | Chen | ........ 361/740 |
| 7,120,032 | B2 * | 10/2006 | Lin et al. | ........ 361/801 |
| 7,399,196 | B2 * | 7/2008 | Chang | ........ 439/377 |
| 7,561,440 | B2 * | 7/2009 | Dai | ........ 361/801 |
| 7,596,001 | B2 * | 9/2009 | Tang | ........ 361/801 |
| 7,715,209 | B2 | 5/2010 | Dai | |
| 7,775,201 | B2 * | 8/2010 | Cooper | ........ 124/86 |
| 2006/0198115 | A1 * | 9/2006 | Chen et al. | ........ 361/796 |

(Continued)

FOREIGN PATENT DOCUMENTS

| CN | 101593007 A | 12/2009 |
| TW | 573757 | 1/2004 |
| TW | M331272 | 4/2008 |
| TW | I336230 | 1/2011 |

OTHER PUBLICATIONS

Office action mailed on Jul. 8, 2013 for the Taiwan application No. 100115770, filed: May 5, 2011, p. 2-10, p. 11 line 1~12 and p. 13.

(Continued)

*Primary Examiner* — Daniel P. Stodola
*Assistant Examiner* — Jonathan Masinick
(74) *Attorney, Agent, or Firm* — Winston Hsu; Scott Margo

(57) ABSTRACT

A fixing mechanism includes a casing, a bracket structure, and a fixing rod. The bracket structure is disposed at a side of the casing corresponding to an interface card and has a positioning member and a pivot member. The fixing rod is movably disposed on the bracket structure and includes a clamping portion, a hook portion, and a torsion-spring portion. The clamping portion is used for clamping an end of a bending board of the interface card cooperatively with the bracket structure. The hook portion is connected to a first end of the clamping portion for hooking the positioning member when the clamping portion moves to a fixing position. The torsion-spring portion is connected to a second end of the clamping portion and pivotally connected to the pivot member for driving the clamping portion to a releasing position to separate the clamping portion from the end of the bending board.

13 Claims, 6 Drawing Sheets

(56) References Cited

U.S. PATENT DOCUMENTS

2009/0094806 A1* 4/2009 Okuda et al. .................... 24/457
2009/0296363 A1* 12/2009 Dai .............................. 361/801

OTHER PUBLICATIONS

Office action mailed on Jan. 13, 2014 for the China application No. 201110139973.X, p. 3 line 4-30 and p. 4.

* cited by examiner

FIXING MECHANISM FOR FIXING AT LEAST ONE INTERFACE CARD AND FIXING ROD THEREOF

BACKGROUND OF THE INVENTION

1. Field of the Invention

The present invention relates to a fixing mechanism and a fixing rod thereof, and more specifically, to a fixing mechanism for fixing at least one interface card and a fixing rod thereof.

2. Description of the Prior Art

In general, for assembly of a computer, a conventional design for fixing an interface card is to utilize screws to fix the interface card onto a casing of the computer. For example, please refer to FIG. 1, which is a partial diagram of a casing 10 having interface cards 12 disposed thereon according to the prior art. A bracket structure 14 is disposed on a position of the casing 10 corresponding to the interface cards 12 (three shown in FIG. 1). Each interface card 12 has a bending board 16. An end 18 of the bending board 16 is used for leaning against the bracket structure 14. As shown in FIG. 1, for making the interface card 12 disposed on the bracket structure 14 more firmly, a screw 20 as shown in FIG. 1 can be utilized to screw the end 18 of the bending board 16 onto the bracket structure 14. Accordingly, the problem that the interface card 12 may be separate from the casing 10 due to special circumstances (e.g. receiving sudden impact) so as to cause a computer failure can be further avoided. However, as mentioned above, if a user wants to assemble the interface card 12 onto the casing 10, the said screw locking process is time-consuming and strenuous. On the other hand, if the interface card 12 needs to be detached from the casing 10, a subsequent disassembly process for detaching the interface card 12 from the bracket structure 14 is also complicated. To sum up, the said screw-locking design causes much inconvenience in assembly and disassembly of the interface card 12.

SUMMARY OF THE INVENTION

The present invention provides a fixing mechanism including a casing, a bracket structure, and a fixing rod. The bracket structure is disposed at a side of the casing corresponding to an interface card and has a positioning member and a pivot member. The fixing rod is movably disposed on the bracket structure and includes a clamping portion, a hook portion, and a torsion-spring portion. The clamping portion is used for clamping an end of a bending board of the interface card cooperatively with the bracket structure. The hook portion is connected to a first end of the clamping portion for hooking the positioning member when the clamping portion moves to a fixing position. The torsion-spring portion is connected to a second end of the clamping portion and pivotally connected to the pivot member for driving the clamping portion to a releasing position to separate the clamping portion from the end of the bending board.

The present invention further provides a fixing rod for fixing at least one interface card. The interface card has a bending board and is contained in a casing. A bracket structure is disposed at a side of the casing corresponding to the interface card. An end of the bending board leans against the bracket structure. The fixing rod includes a clamping portion, a hook portion, and a torsion-spring portion. The clamping portion is used for clamping the end of the bending board cooperatively with the bracket structure when moving to a fixing position. The hook portion is connected to a first end of the clamping portion for hooking a positioning member of the bracket structure when the clamping portion moves to the fixing position. The torsion-spring portion is connected to a second end of the clamping portion and pivotally connected to a pivot member of the bracket structure for driving the clamping portion to a releasing position to separate the clamping portion from the end of the bending board.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
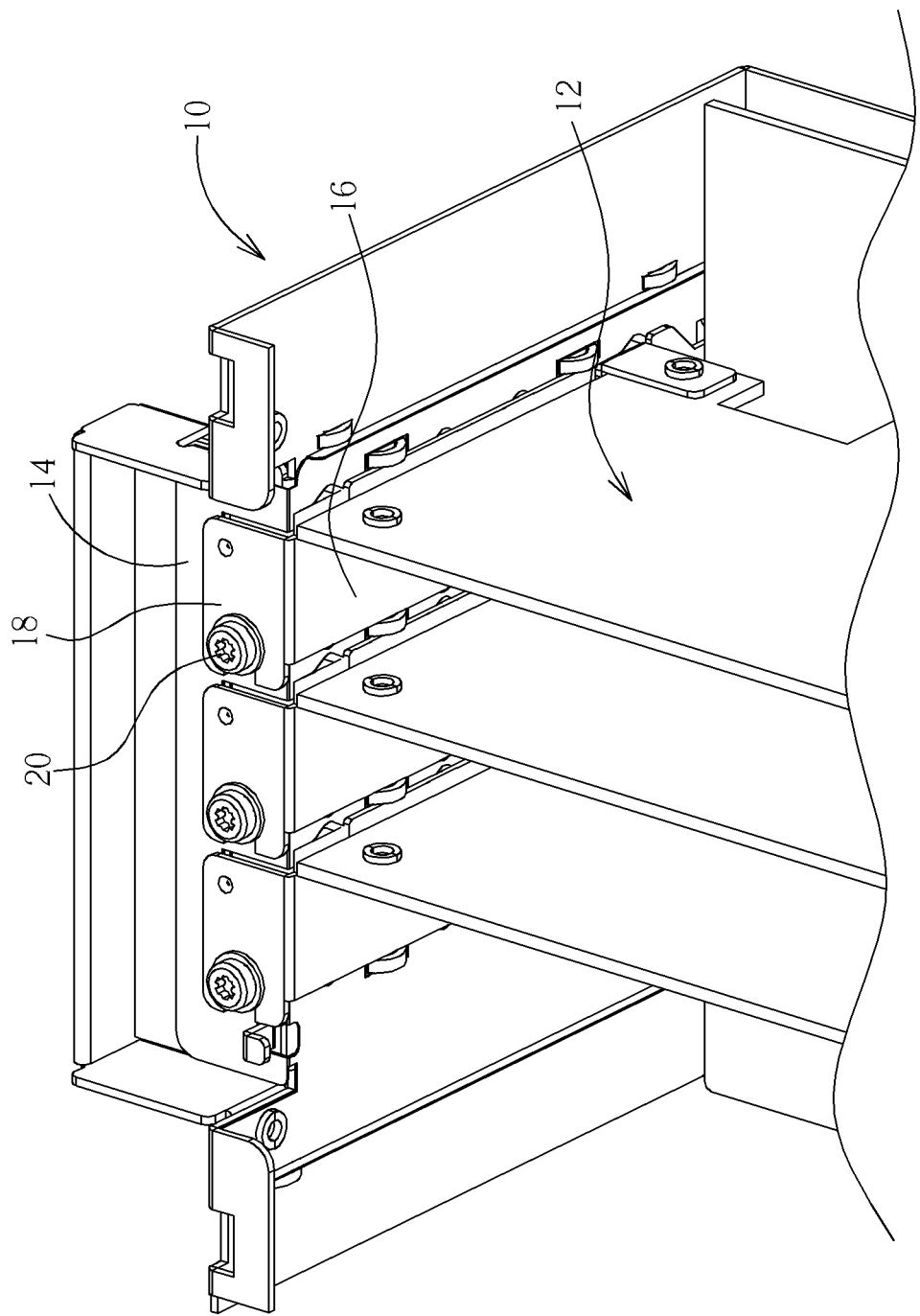
FIG. 1 is a partial diagram of a casing having interface cards disposed thereon according to the prior art.
Figure 2:
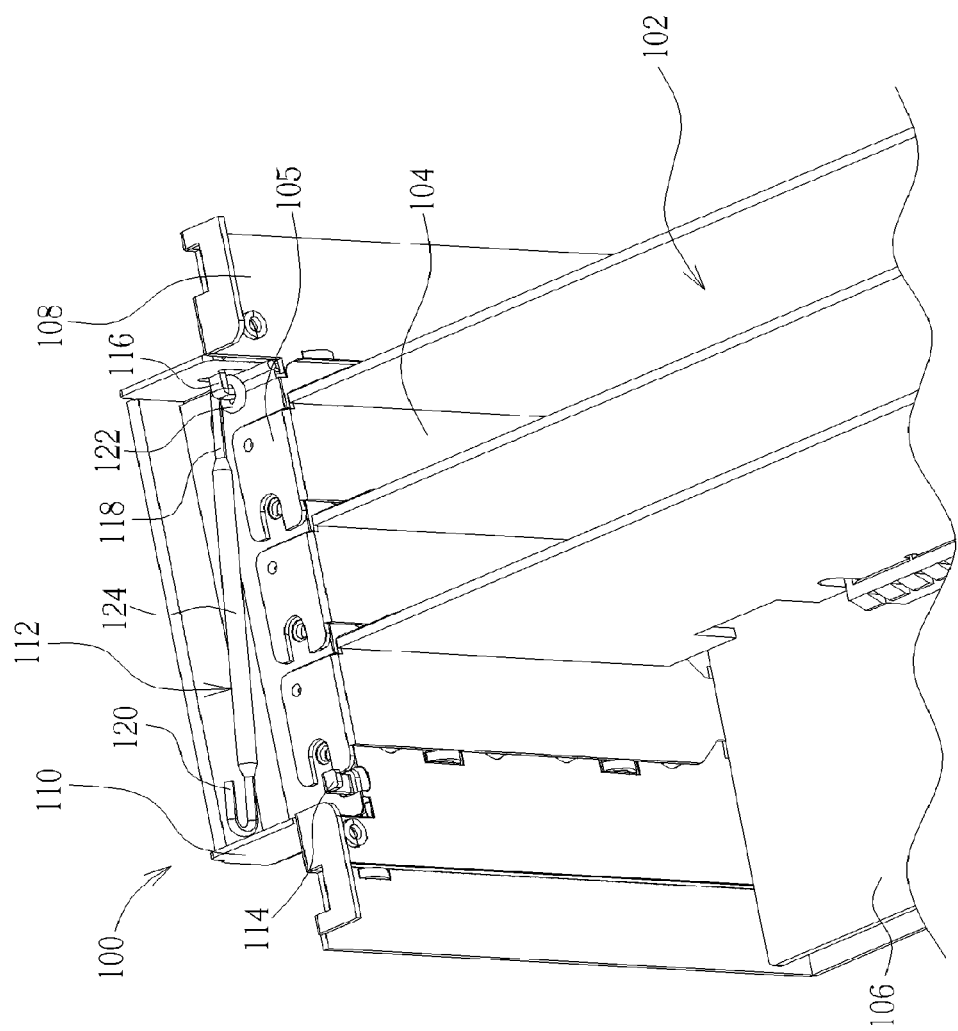
FIG. 2 is a partial diagram of a fixing mechanism according to an embodiment of the present invention.

Please refer to FIG. 2, which is a partial diagram of a fixing mechanism 100 according to an embodiment of the present invention. The fixing mechanism 100 is used for fixing at least one interface card 102 (three shown in FIG. 2). In this embodiment, the interface card 102 is a conventional interface card (e.g. a graphic card) and has a bending board 104. The interface card 102 is installed on a motherboard 106, but is not limited thereto. For example, the interface card 102 can also be an independent interface card which is not installed on the motherboard 106, such as a Bluetooth network card. As shown in FIG. 2, the fixing mechanism 100 includes a casing 108 (partially shown in FIG. 2), a bracket structure 110, and a fixing rod 112. The casing 108 is used for containing the interface card 102. The casing 108 is a conventional computer casing, and the related description is omitted herein since its structural design is commonly seen in the prior art. The bracket structure 110 is disposed at a side of the casing 108 corresponding to the interface card 102 and has a positioning member 114 and a pivot member 116, wherein an end 105 of the bending board 104 leans against the bracket structure 110.

Figure 3:
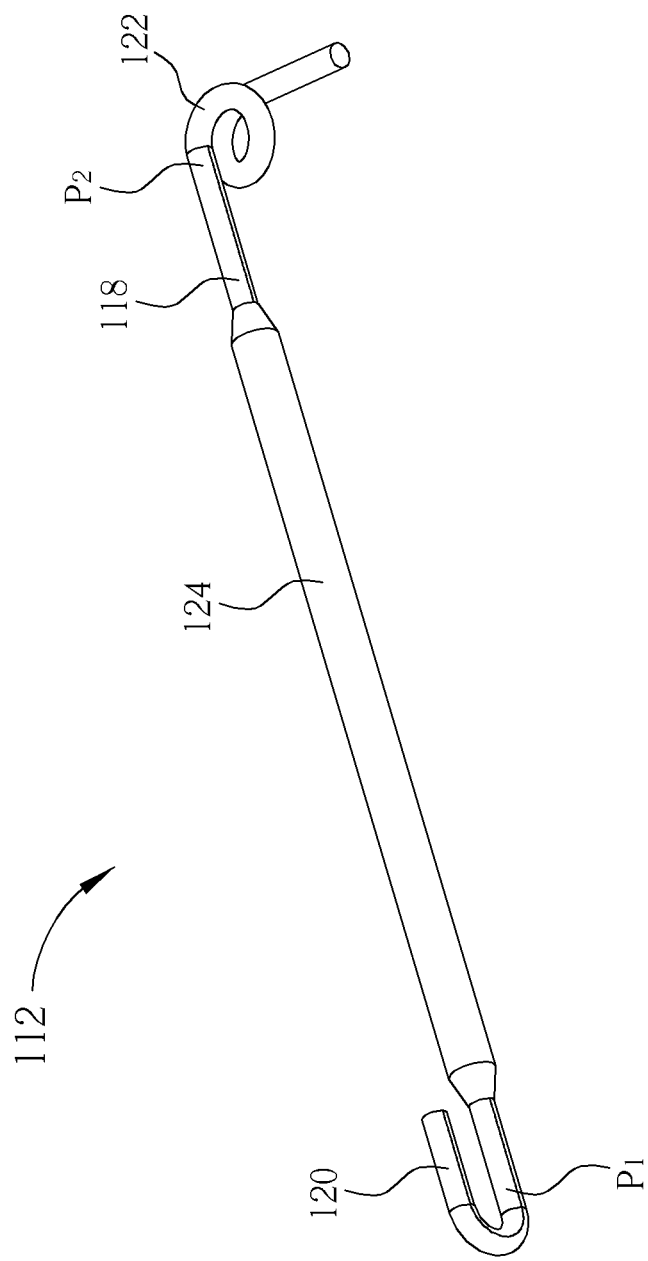
FIG. 3 is an enlarged diagram of a fixing rod in FIG. 2.

More detailed description for the structural design of the fixing rod 112 is provided as follows. Please refer to FIG. 2 and FIG. 3. FIG. 3 is an enlarged diagram of the fixing rod 112 in FIG. 2. The fixing rod 112 is movably disposed on the bracket structure 110. The fixing rod 112 includes a clamping portion 118, a hook portion 120, a torsion-spring portion 122, and a cushion member 124. The clamping portion 118 is used for clamping the end 105 of the bending board 104 cooperatively with the bracket structure 110. The hook portion 120 is connected to a first end $P_1$ of the clamping portion 118 for selectively hooking the positioning member 114. The torsion-spring portion 122 is connected to a second end $P_2$ of the clamping portion 118 and pivotally connected to the pivot member 116. The torsion-spring portion 122 is used for providing elastic force to drive the clamping portion 118 to a releasing position as shown in FIG. 2, so as to make the clamping portion 118 separate from the end 105 of the bending board 104. In this embodiment, the clamping portion 118, the hook portion 120, and the torsion-spring portion 122 are formed integrally and made of stainless steel material for enhancing the structural strength of the fixing rod 112. The cushion member 124 is disposed on a position of the clamping portion 118 corresponding to the end 105 of the bending board 104. In this embodiment, the cushion member 124 is disposed around the clamping portion 118 and is preferably made of PVC (Polyvinylchloride) or rubber material.

Figure 4:
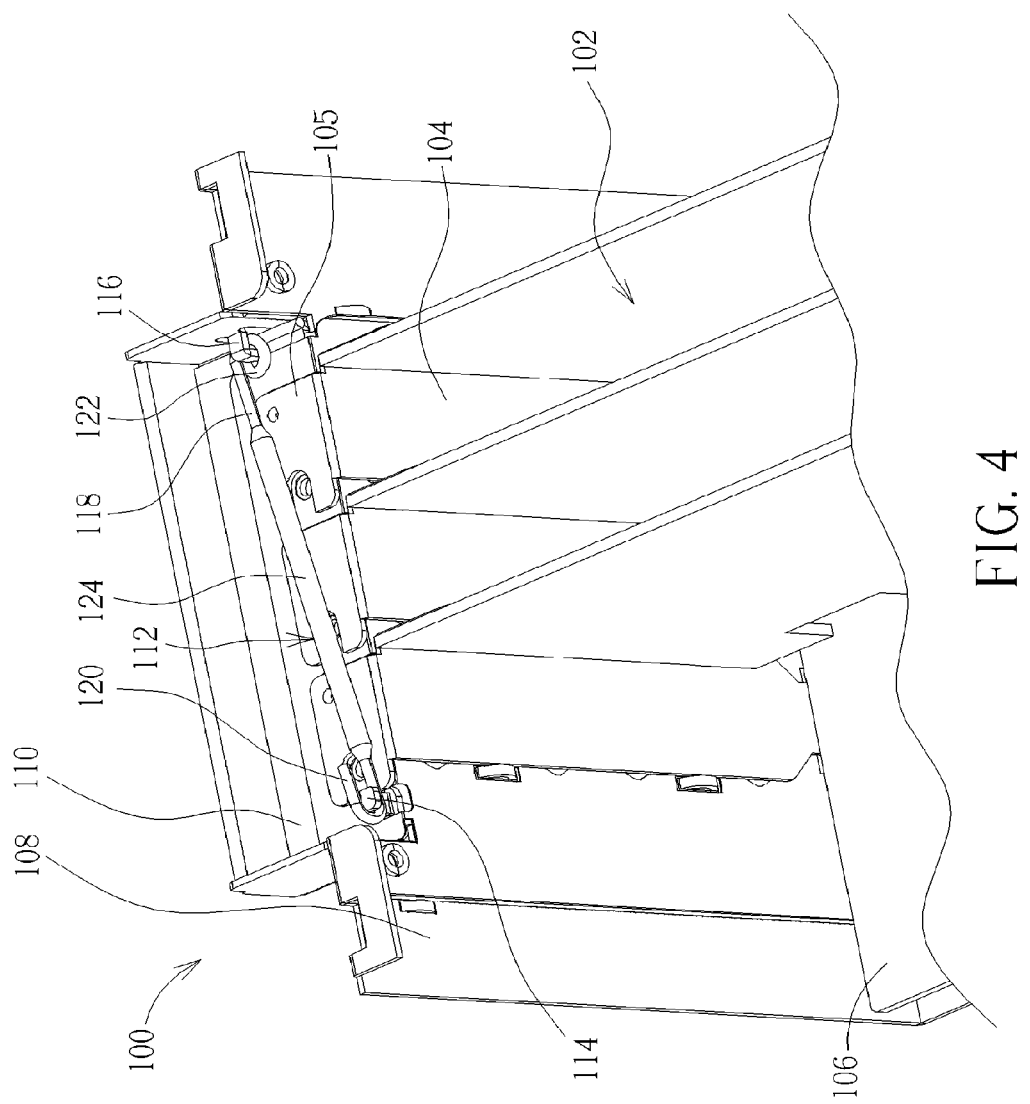
FIG. 4 is a partial diagram of the fixing mechanism in FIG. 2 when a clamping portion moves to a fixing position.

In the following, assembly and disassembly of the fixing mechanism 100 and the interface card 102 is described in detail. Please refer to FIG. 2 and FIG. 4. FIG. 4 is a partial diagram of the fixing mechanism 100 in FIG. 2 when the clamping portion 118 moves to a fixing position. When a user wants to fix the interface card 102 onto the bracket structure 110, the end 105 of the bending board 104 needs to lean against the bracket structure 100 first. Subsequently, the user needs to push the clamping portion 118 of the fixing rod 112 from the releasing position as shown in FIG. 2 to the fixing position as shown in FIG. 4, and then make the hook portion 120 hook the positioning member 114. At this time, as shown in FIG. 4, the fixing rod 112 can utilize the clamping portion 118 having the cushion member 124 disposed thereon to clamp the end 105 of the bending board 104 cooperatively with the bracket structure 110. In such a manner, the interface card 102 can be fixed onto the bracket structure 110 firmly, so as to complete the assembly process of the fixing mechanism 100 and the interface card 102. To be noted, even if assembly tolerances occur between the fixing mechanism 100 and the interface card 102, the fixing mechanism 100 can still utilize elasticity of the cushion member 124 to absorb the said assembly tolerances via the design that the cushion member 124 is disposed around the clamping portion 118. Thus, the problem that the clamping portion 118 and the bracket structure 110 can not clamp the end 105 of the bending board 104 tightly due to the said assembly tolerances can be further avoided.

On the other hand, when the interface card 102 needs to be detached from the casing 108, the user just needs to pull the hook portion 120 to be detached from the positioning member 114. At this time, since the positioning member 114 is no longer hooked by the hook portion 120, elastic force provided by the torsion-spring portion 122 drives the clamping portion 118 from the fixing position as shown in FIG. 4 to the releasing position as shown in FIG. 2, so as to make the clamping portion 118 separate from the end 105 of the bending board 104. That is to say, the end 105 of the bending board 104 is no longer clamped by the clamping portion 118 and the bracket structure 110. Thus, the interface card 102 can be taken from the fixing mechanism 100 easily, so as to complete the disassembly process of the fixing mechanism 100 and the interface card 102.

The said cushion member 124 is an omissible component, meaning that the fixing mechanism 100 can only utilize the clamping portion 118 of the fixing rod 112 to clamp the end 105 of the bending board 104 cooperatively with the bracket structure 110 for simplifying the structural design of the fixing rod 112.

Figure 5:
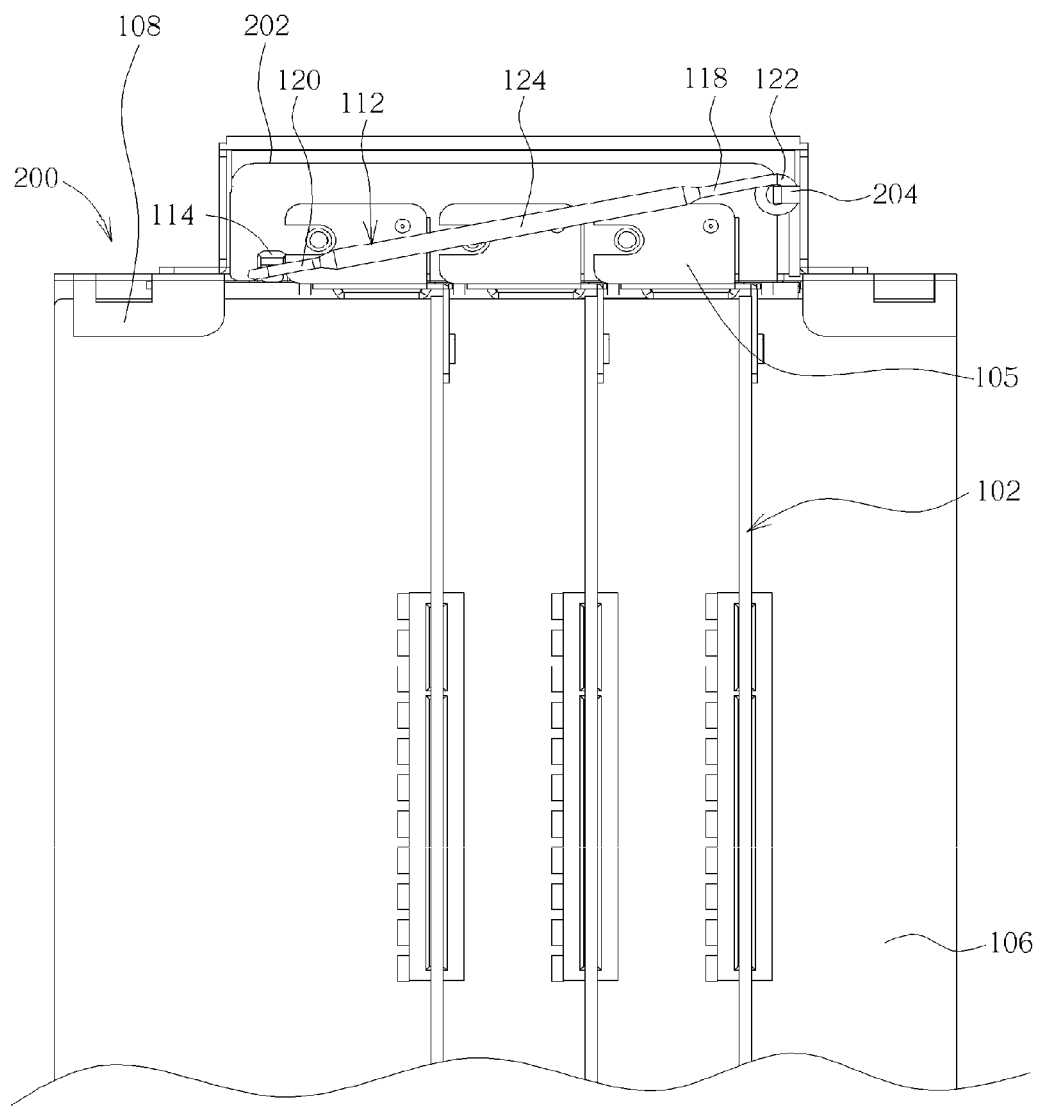
FIG. 5 is a partial top view of a fixing mechanism when a hook portion of the fixing rod hooks a positioning portion according to another embodiment of the present invention.
Figure 6:
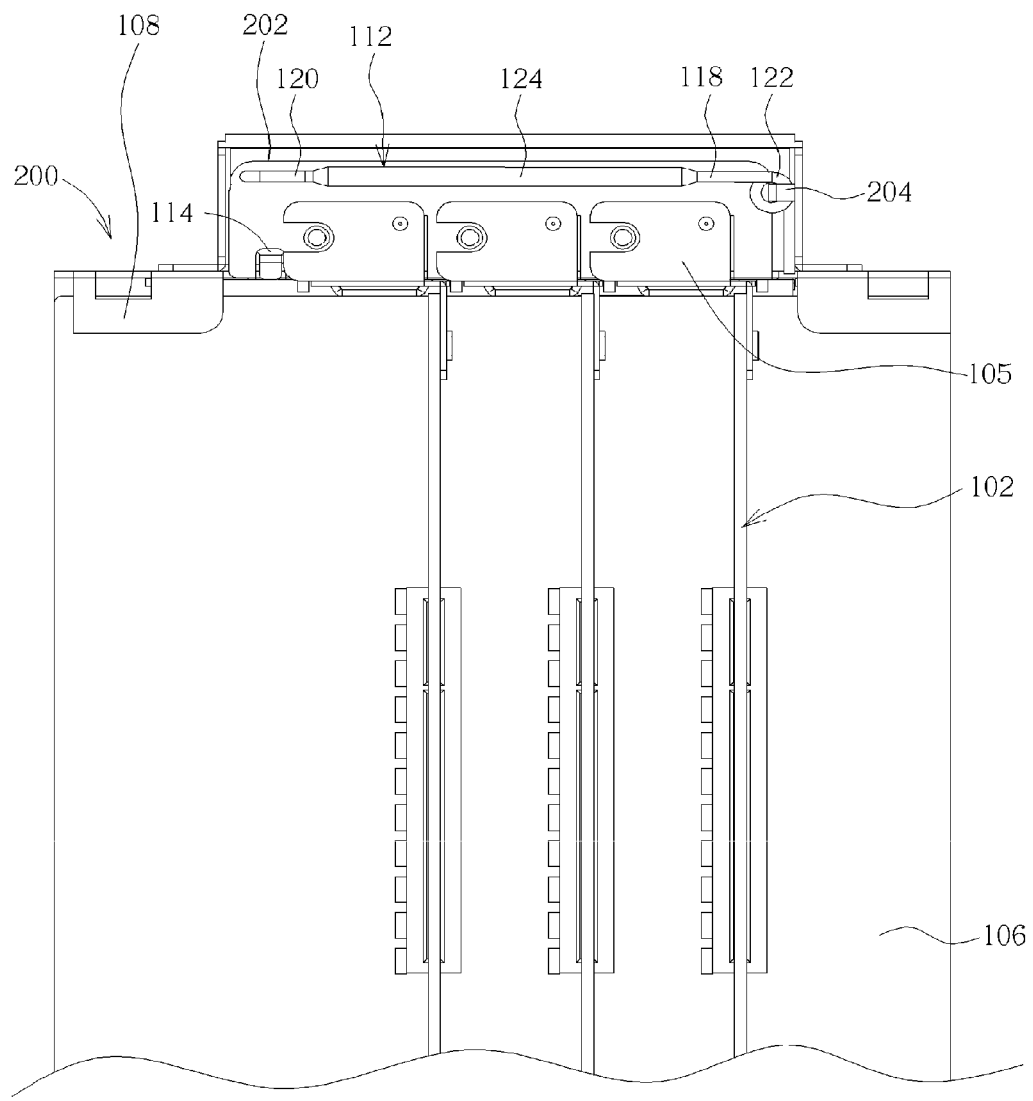
FIG. 6 is a partial top view of the fixing mechanism in FIG. 5 when the clamping portion moves to a releasing position.

Furthermore, the configuration of the fixing rod 112 and the bracket structure 110 is not limited to the said embodiment, meaning that it may vary with the practical application of the fixing mechanism 100. For example, please refer to FIG. 5, which is a partial top view of a fixing mechanism 200 when the hook portion 120 of the fixing rod 112 hooks the positioning portion 114 according to another embodiment of the present invention. Components both mentioned in this embodiment and the said embodiment represent components with similar functions or structures, and the related description is omitted herein. The major difference between the fixing mechanism 200 and the fixing mechanism 100 is disposal of the pivot member. The fixing mechanism 200 includes the casing 108, the fixing rod 112, and a bracket structure 202. The bracket structure 202 is disposed at a side of the casing 108 corresponding to the interface card 102 and has the positioning member 114 and a pivot member 204. In this embodiment, the pivot member 204 is preferably formed on a position of the bracket structure 202 corresponding to a corner of the end 105 of the bending structure 104. In such a manner, when the torsion-spring portion 122 drives the clamping portion 118 from a fixing position as shown in FIG. 5 to a releasing position as shown in FIG. 6, the clamping portion 118 can be adjacent to and substantially parallel to the edge of the end 105 of the bending board 104. In other words, via the design that the pivot member 204 is formed on the position corresponding to the corner of the end 105 of the bending board 104 and elasticity of the torsion-spring portion 122 is adjusted appropriately, the clamping portion 118 can be driven to the releasing position as shown in FIG. 6 by elastic force provided from the torsion-spring portion 122 when the hook portion 122 does not hook the positioning member 114. Thus, compared with FIG. 2, the fixing mechanism 200 can reduce space occupied by the bracket structure 202 efficiently since the bracket structure 202 has no needs to provide additional space to make sure that the clamping portion can be totally separate from the end 105 of the bending board 104. As for the related description for assembly and disassembly of the fixing mechanism 200 and the interface card 102, it can be reasoned by analogy according to the said embodiment and therefore omitted herein.

Compared with the prior art, the fixing mechanism provided by the present invention utilizes the design that the torsion-spring portion is pivotally connected to the pivot member, the hook portion hooks the positioning member, and the clamping portion clamps the end of the bending board cooperatively with the bracket structure, to fix the interface card onto the bracket structure, so that the complicated assembly process caused by the said screw-locking method aforementioned in the prior art can be omitted. Furthermore, the fixing mechanism can also utilize the elastic force provided by the torsion-spring portion to drive the clamping portion to be separate from the end of the bending board, so as to make the interface card capable of being detached from the bracket structure conveniently. In such a manner, via the said simple designs, the present invention can achieve the purpose that the interface card can be fixed onto or detached from the casing quickly by the fixing mechanism, so as to enhance convenience of the interface card in assembly and disassembly.

Those skilled in the art will readily observe that numerous modifications and alterations of the device and method may be made while retaining the teachings of the invention.

What is claimed is:

1. A fixing mechanism for fixing at least one interface card having a bending board, the fixing mechanism comprising:
   a casing for containing the interface card;
   a bracket structure disposed at a side of the casing corresponding to the interface card and having a positioning member and a pivot member, the bracket structure further having a support surface for supporting an end of the bending board; and
   a fixing rod movably disposed on the bracket structure, the fixing rod comprising:
      a clamping portion for clamping an end of the bending board cooperatively with the bracket structure when moving to a fixing position;

a hook portion connected to a first end of the clamping portion for hooking the positioning member when the clamping portion moves to the fixing position; and a torsion-spring portion connected to a second end of the clamping portion and pivotally connected to the pivot member so as to make the clamping portion and the hook portion capable of rotating parallel to the support surface to the fixing position overlapping with the end of the bending board or rotating parallel to the support surface to a releasing position not overlapping with the end of the bending board, the torsion-spring portion being used for driving the clamping portion to the releasing position to separate the clamping portion from the end of the bending board.

2. The fixing mechanism of claim 1, wherein the pivot member is formed on a position of the bracket structure corresponding to a corner of the end of the bending board.

3. The fixing mechanism of claim 2, wherein when the torsion-spring portion drives the clamping portion to move to the releasing position, the clamping portion is adjacent to and substantially parallel to the edge of the end of the bending structure.

4. The fixing mechanism of claim 1, wherein the fixing rod further comprises:

a cushion member disposed on a position of the clamping portion corresponding to the end of the bending board.

5. The fixing mechanism of claim 4, wherein the cushion member is disposed around the clamping portion.

6. The fixing mechanism of claim 4, wherein the cushion member is made of polyvinylchloride or rubber material.

7. The fixing mechanism of claim 1, wherein the clamping portion, the hook portion, and the torsion-spring portion are formed integrally and made of stainless steel material.

8. A fixing rod for fixing at least one interface card, the interface card having a bending board and being contained in a casing, a bracket structure being disposed at a side of the casing corresponding to the interface card, an end of the bending board leaning against an support surface of the bracket structure, the fixing rod comprising:

a clamping portion for clamping the end of the bending board cooperatively with the bracket structure when moving to a fixing position;

a hook portion connected to a first end of the clamping portion for hooking a positioning member of the bracket structure when the clamping portion moves to the fixing position; and a torsion-spring portion connected to a second end of the clamping portion and pivotally connected to a pivot member of the bracket structure so as to make the clamping portion and the hook portion capable of rotating parallel to the support surface to the fixing position overlapping with the end of the bending board or rotating parallel to the support surface to a releasing position not overlapping with the end of the bending board, the torsion-spring portion being used for driving the clamping portion to the releasing position to separate the clamping portion from the end of the bending board.

9. The fixing rod of claim 8, wherein when the torsion-spring portion drives the clamping portion to move to the releasing position, the clamping portion is adjacent to and substantially parallel to the edge of the end of the bending board.

10. The fixing rod of claim 8, wherein the fixing rod further comprises:

a cushion member disposed on a position of the clamping portion corresponding to the end of the bending board.

11. The fixing rod of claim 10, wherein the cushion member is disposed around the clamping portion.

12. The fixing rod of claim 10, wherein the cushion member is made of polyvinylchloride or rubber material.

13. The fixing rod of claim 8, wherein the clamping portion, the hook portion, and the torsion-spring portion are formed integrally and made of stainless steel material.

* * * * *